(12) United States Patent
Hishida

(10) Patent No.: US 7,222,476 B2
(45) Date of Patent: May 29, 2007

(54) HAND-PUSHED MOWER

(75) Inventor: Tadashi Hishida, Sakai (JP)

(73) Assignee: VIV Engineering Inc., Sakai-shi (JP)

( * ) Notice: Subject to any disclaimer, the term of this patent is extended or adjusted under 35 U.S.C. 154(b) by 244 days.

(21) Appl. No.: 10/958,375

(22) Filed: Oct. 6, 2004

(65) Prior Publication Data
US 2005/0044835 A1 Mar. 3, 2005

(51) Int. Cl.
*A01D 34/00* (2006.01)
(52) U.S. Cl. .................. 56/12.7; 56/17.1; 56/17.2; 16/25; 16/26
(58) Field of Classification Search ............... 56/12.7, 56/17.2, 17.1; 16/21, 24–26, 41, 18 CG, 16/18
See application file for complete search history.

(56) References Cited

U.S. PATENT DOCUMENTS

| 1,053,895 | A | * | 2/1913 | Algermissen | 16/26 |
| 1,440,641 | A | * | 1/1923 | Stevens | 16/26 |
| 2,779,965 | A | * | 2/1957 | Schilberg | 16/26 |
| 3,456,281 | A | * | 7/1969 | Lowry | 16/25 |
| 4,402,108 | A | * | 9/1983 | Pannwitz | 16/26 |
| 4,603,999 | A | * | 8/1986 | Laditka | 404/112 |
| D347,368 | S | * | 5/1994 | Gedert | D8/8 |
| 5,459,985 | A | * | 10/1995 | Gedert | 56/17.2 |
| 5,467,584 | A | * | 11/1995 | Boyles | 56/12.7 |
| 6,871,484 | B1 | * | 3/2005 | Sartain | 56/12.7 |
| 2005/0060840 | A1 | * | 3/2005 | Polevoy et al. | 16/26 |

FOREIGN PATENT DOCUMENTS

JP 11-127654 5/1999

* cited by examiner

*Primary Examiner*—Thomas B. Will
*Assistant Examiner*—Alicia Torres
(74) *Attorney, Agent, or Firm*—Armstrong, Kratz, Quintos, Hanson & Brooks, LLP.

(57) ABSTRACT

A hand-pushed mower of which blade height setter is provided with a sphere rolling on the ground, many small spheres holding the sphere as to freely roll, a semi-spherical receiving member forming a gap between an upper spherical face of the sphere to hold the many small spheres in the gap, and a scraping ring frame portion disposed to be parallel to and having a predetermined interval with a lower end edge of the semi-spherical receiving member. The scraping ring frame portion is disposed to be near the surface of the sphere as to scrape foreign matter on the surface of the sphere. A window portion for removing the foreign matter is formed between the lower end edge of the semi-spherical receiving member and the scraping ring frame portion.

5 Claims, 6 Drawing Sheets

HAND-PUSHED MOWER

BACKGROUND OF THE INVENTION

1. Field of the Invention

This invention relates to a hand-pushed mower.

2. Description of the Related Art

A conventional hand-pushed mower is provided with a frame, a pair of wheels disposed on a lower end of the frame, a handle disposed on an upper end of the frame, and a mowing blade disposed in front of the pair of wheels (refer to Japanese provisional publication No. 11-127654, for example).

In mowing with the hand-pushed mower, a worker holding the handle pushes the mower with hands to proceed and rotate the mowing blade by rotation of the proceeding wheels as a driving source for mowing.

However, in this conventional hand-pushed mower, regulation of the height of the mowing blade is difficult, the wheels tend to fall into concave portions on rough ground having great convex and concave portions, the mower can not be smoothly pushed and the blade is not properly rotated, and the operation of the mower becomes difficult and dangerous thereby. So the mower is difficult to manage when the worker is not a highly-skilled adult.

It is therefore an object of the present invention to provide a hand-pushed mower which can mow with even height safely and easily without high skill, and can be easily controlled even on a place with great convex and concave portions.

BRIEF DESCRIPTION OF THE DRAWINGS

The present invention will be described with reference to the accompanying drawings in which.

DESCRIPTION OF THE PREFERRED EMBODIMENTS

Preferred embodiments of the present invention will now be described with reference to the accompanying drawings.

Figure 1:
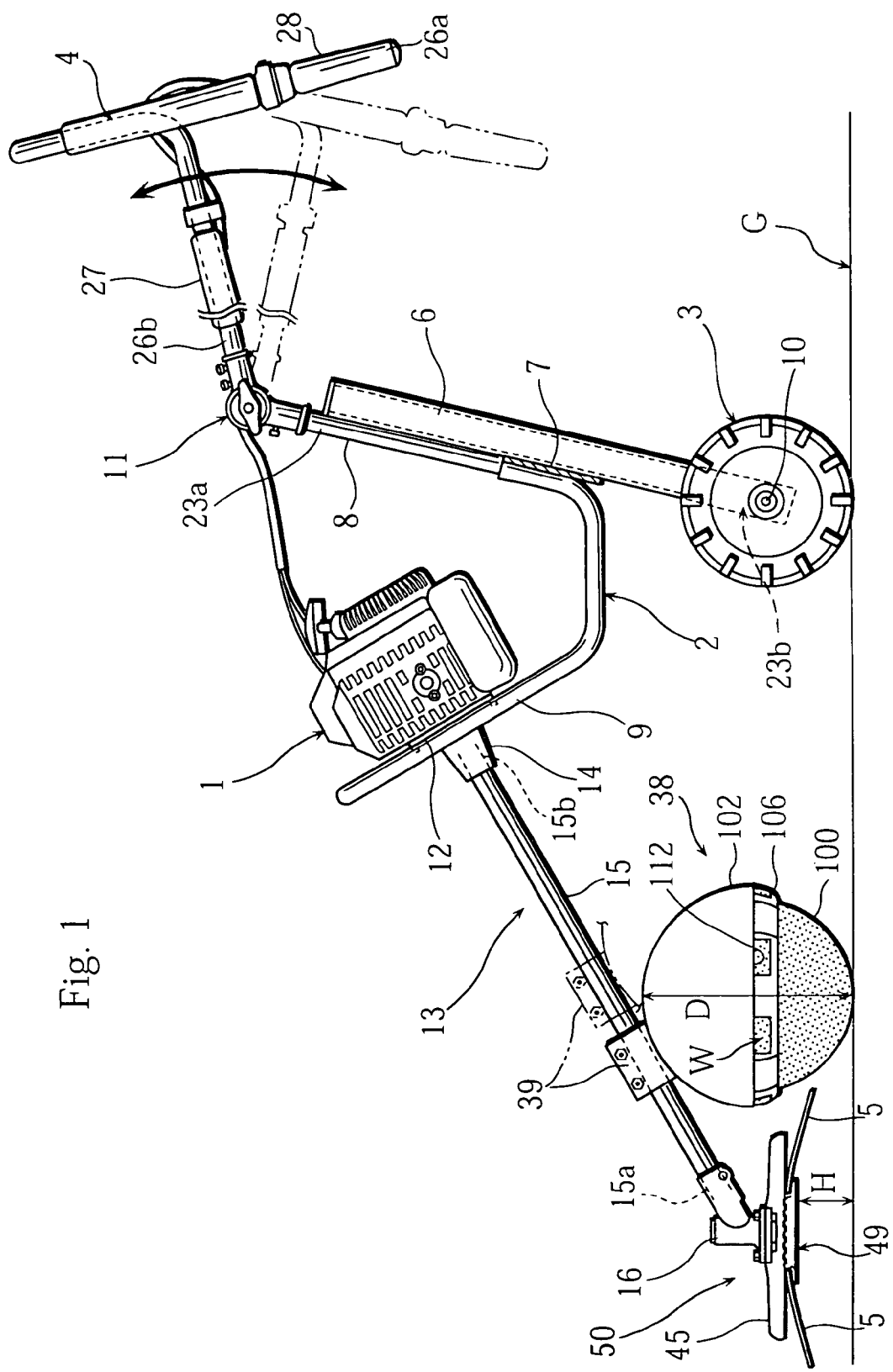
FIG. 1 is a side view showing a first embodiment of the present invention.
Figure 2:
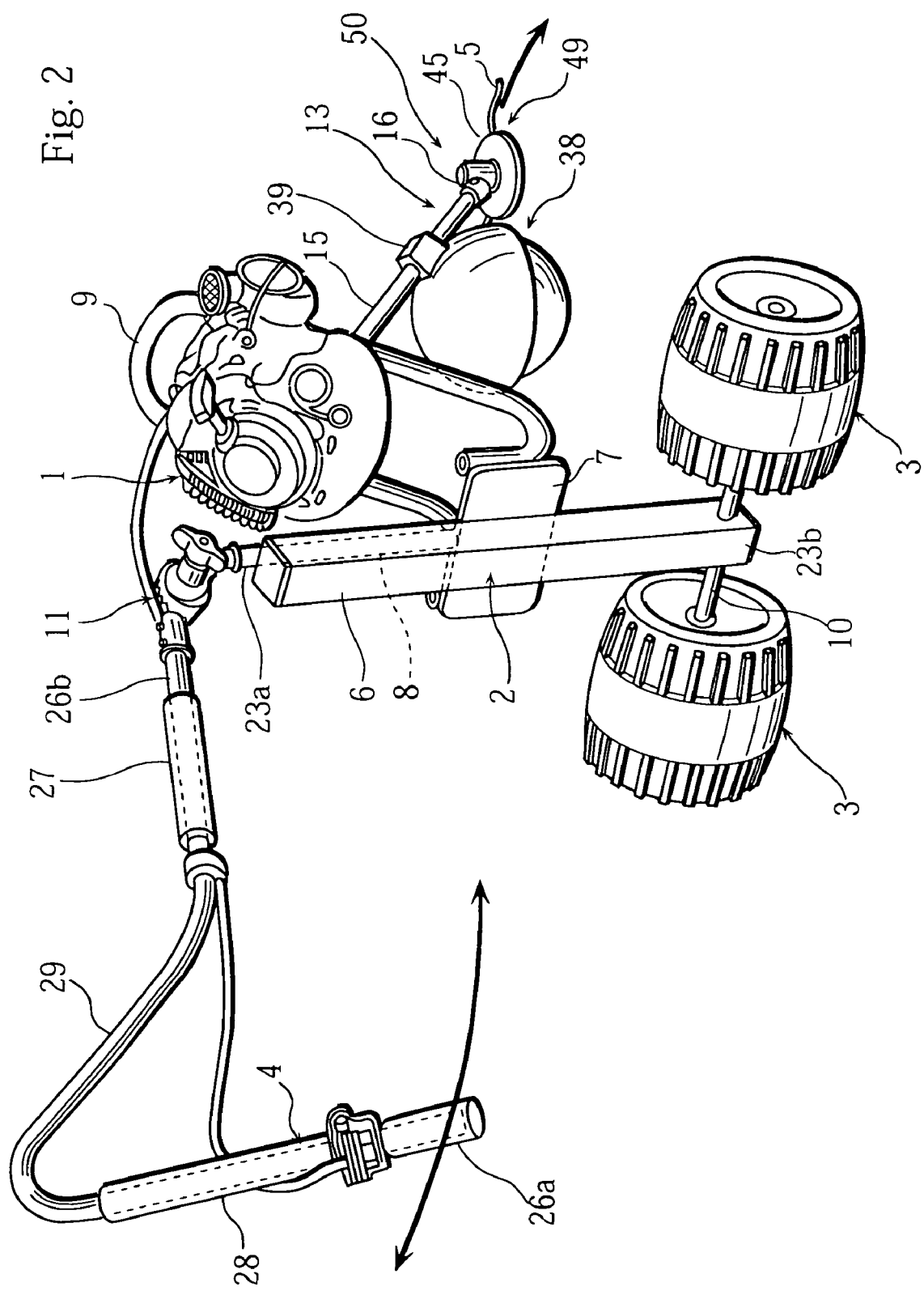
FIG. 2 is a perspective view of a hand-pushed mower observed obliquely from behind.

FIG. 1 and FIG. 2 show an embodiment of the present invention. As shown in a side view of FIG. 1 and a perspective view of FIG. 2, a hand-pushed mower relating to the present invention is provided with a frame 2 holding an engine 1, a pair of wheels 3 disposed on a lower end 23b of the frame 2, a handle 4 disposed on an upper end 23a of the frame 2, a mowing blade 5 disposed in front of the pair of wheels 3 and rotated by the engine 1, and a blade height setter 38, disposed in front of the wheels 3 and behind the mowing blade 5, to keep a blade height H at a predetermined value. The mowing blade 5 is composed of a cord body of plastic, and two units of the mowing blade 5 are attached to a rotation plate 49 as to protrude outward in diameter directions. In the present invention, although the wheels 3 are one pair, one wheel 3, having a width to stably run the mower, may be applied.

The frame 2 is provided with a center frame 6 of square pole of which upper end inclines backward, a plate 7 attached to a position front and middle of the center frame 6, a supporting rod 8 for handle attachment disposed on a front face of the upper end side of the center frame 6, and a frame body 9 in which a pipe body is bent U-shaped, of which both ends are fixed to a front face of the plate 7, and of which forth end inclines forward and being bent approximately J-shaped in a side view.

The pair of wheels 3 is attached to a lower end of the center frame 6 through an axle 10 as to freely rotate, and the handle 4 is attached to an upper end of the supporting rod 8 protruding upward from the center frame 6 through an angle adjusting mechanism 11 (described later). The engine 1 is fixed to an attachment board 12 disposed on a forward inclined part of the frame body 9 with screws, etc. The configuration of the frame 2 is variously changeable and not restricted to the configuration shown in Figures. And, the center frame 6, the frame 2, and the supporting rod 8 may be formed by bending a pipe (not shown in Figures).

Mark 13 represents a power transmitting mechanism to hold a rotation plate 49 to which the mowing blades 5 are attached in front of the wheels 3 as to rotate and transmit rotational force from the engine 1 to rotation plate 49. The power transmitting mechanism 13 is provided with a clutch case 14 attached to the front face side of the attachment board 12, a cylindrical holding rod 15 of which base end 15b is connected to the clutch case 14 and forth end 15a is protruding forward and downward, a gear case 16 disposed on the forth end 15a of the holding rod 15, an attachment plate 45 disposed on a lower end of the gear case 16, a driving shaft disposed inside the holding rod 15 connecting the engine 1 and a first gear in the gear case 16 as to freely rotate, and a rotation shaft connecting a second gear engaged with the first gear to the rotation plate 49. And, the handle 4 has a portion 27 in back-and forth direction on a base end 26b side, a portion 28 in up-and-down direction of which forth end 26a is in up-and-down direction, and a middle curved portion 29. And, the base end 26b is attached to the upper end 23a of the frame 2 through the angle adjusting mechanism 11.

Figure 4:
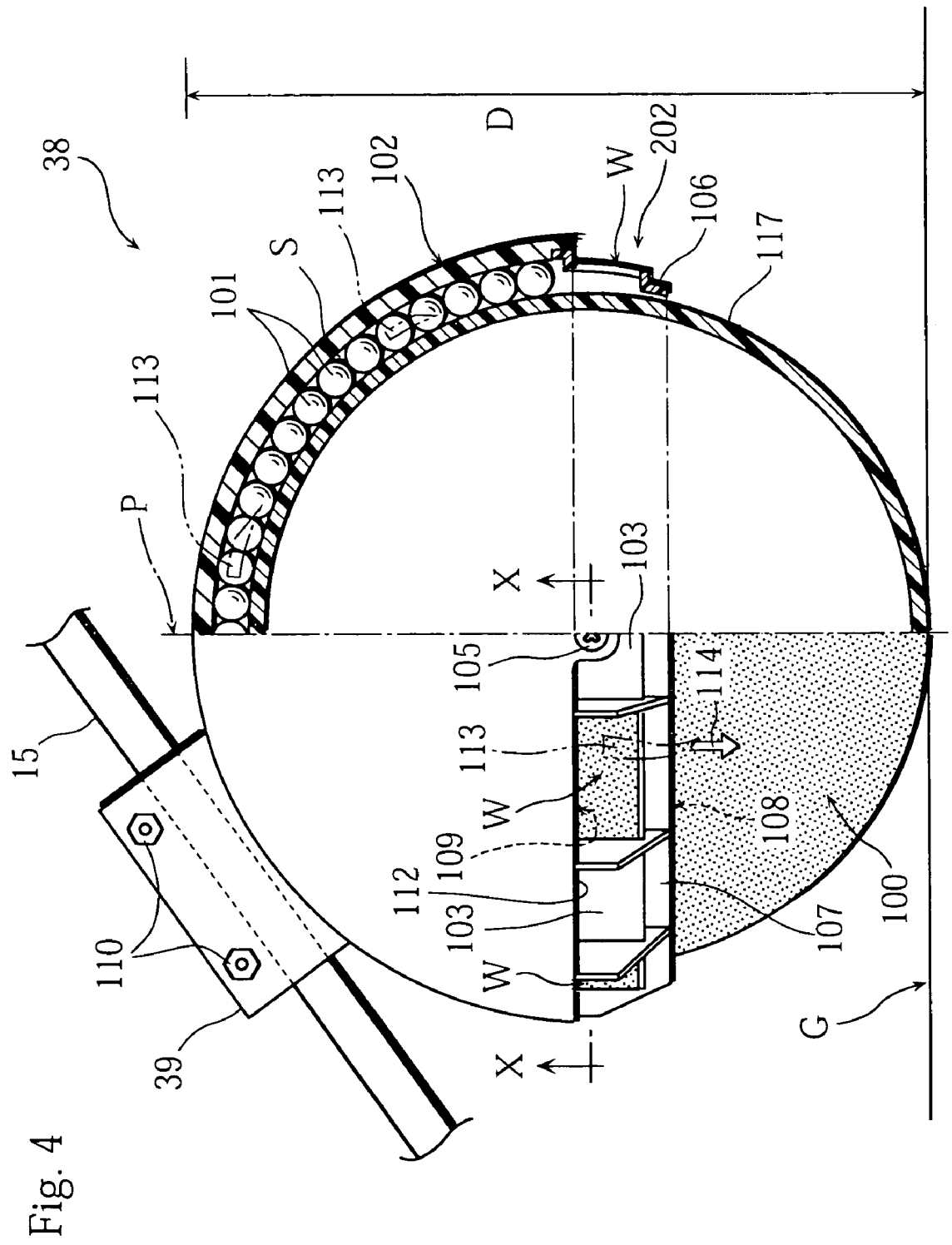
FIG. 4 is a half cross-sectional view of a blade height setter.
Figure 5:
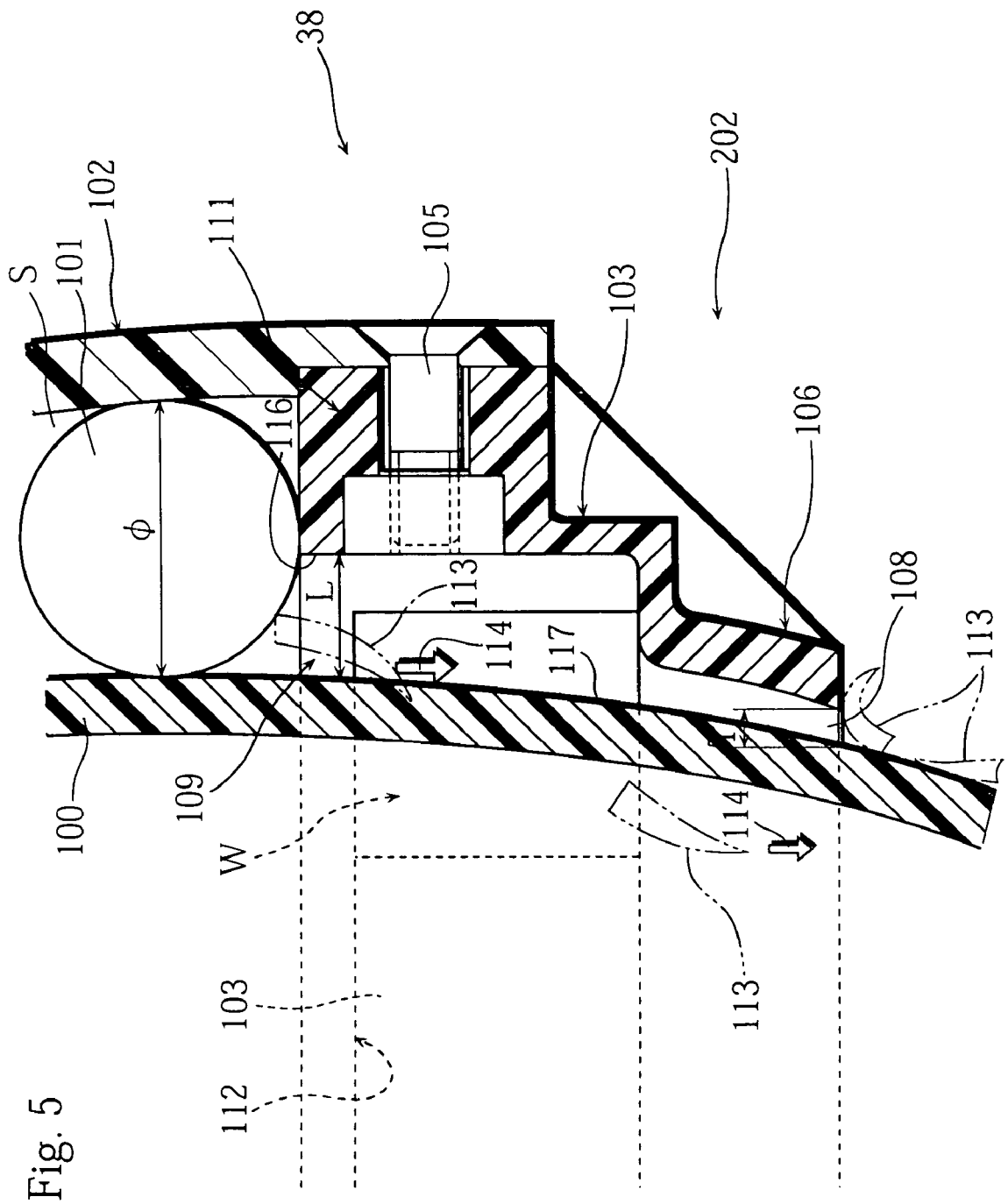
FIG. 5 is an enlarged cross-sectional view of a principal portion.
Figure 6:
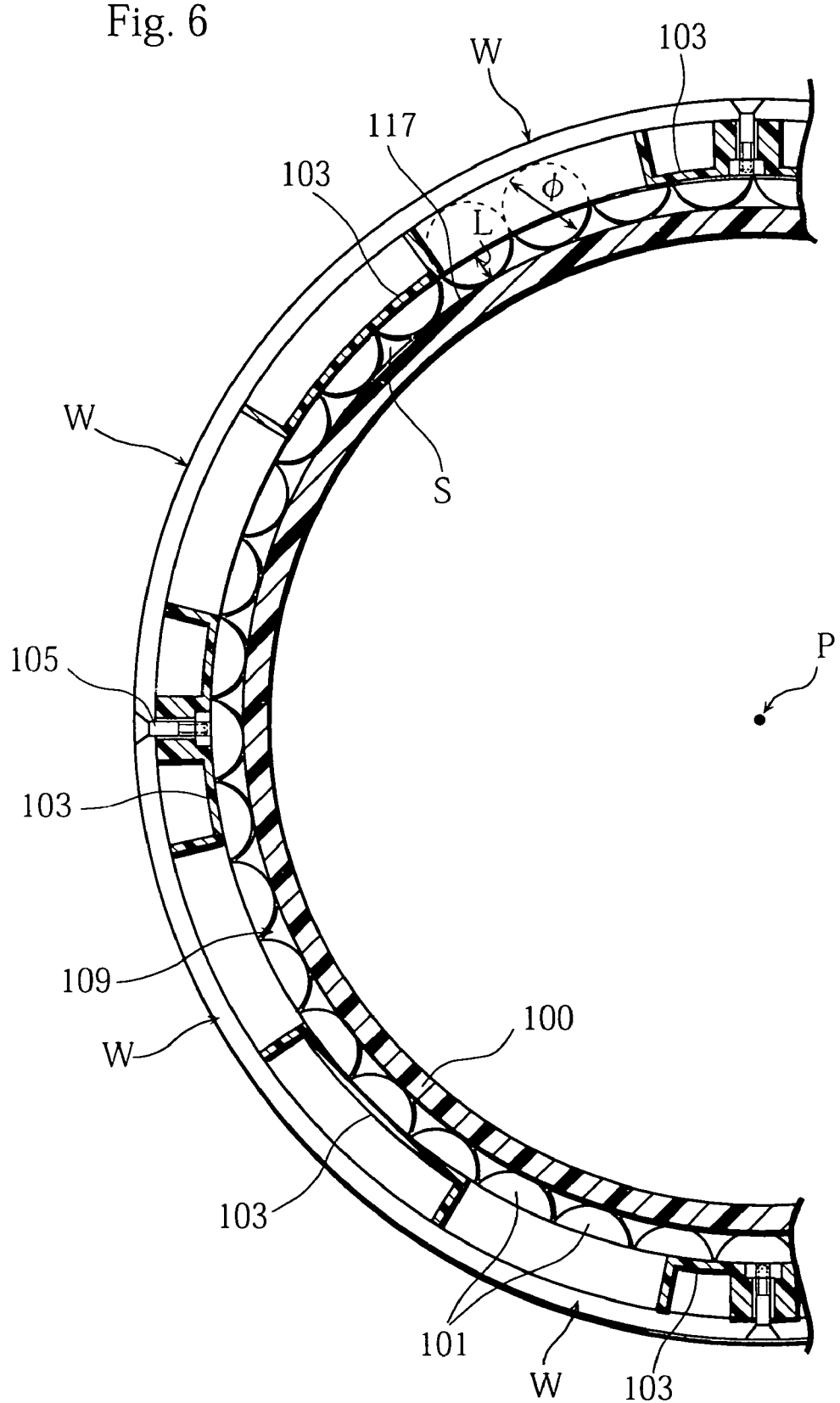
FIG. 6 is a cross-sectional view of X-X in FIG. 4 observed in a direction of arrows X.

And, in the mower, a blade height setter 38 to keep a blade height H of the mowing blade 5 from the ground G at a predetermined value is disposed in front of the wheel 3 and behind the mowing blade 5. FIG. 4 is a half cross-sectional view of the blade height setter 38, FIG. 5 is an enlarged cross-sectional view of a principal portion, and FIG. 6 is a cross-sectional view of FIG. 4 observed in a direction of arrows X. As shown in FIGS. 4, 5, and 6, the blade height setter 38 is provided with a sphere 100 rolling on the ground G, many small spheres 101 holding the sphere 100 as to freely roll, a semispherical receiving member 102 forming a gap S with a spherical face of an upper half of the sphere 100 to hold the small spheres 101, and a scraping ring frame portion 106 disposed parallel to a lower end edge 112 of the semispherical receiving member 102 with a predetermined interval between the lower end edge 112 and the receiving member 102.

The scraping ring frame portion 106 is disposed near a surface 117 to scrape off foreign matter 113 stuck on the surface 117 of the sphere 100, and connected to the lower end edge 112 through plural connecting portions 103 in vertical direction forming window portions W for removing the foreign matter with the lower end edge 112 of the semispherical receiving member 102. A mark 202 represents a stopping ring frame 202 having the above-mentioned scraping ring frame portion 106 and the connecting portions 103. In the ring frame 202, an upper connecting portion 111 is connected to the lower end edge 112 of the semispherical receiving member 102 to hold the sphere 100 within the semispherical receiving member 102. That is to say, upper parts of the connecting portions 103 (the connecting portion 111) prevent the small spheres 101 from falling (being disassembled).

Concretely, the connecting portion 111 of the ring frame 202 is fit to the lower end edge 112 of the semispherical receiving member 102 and screwed with a screw 105 for connection, and an axis P in vertical direction of the semispherical receiving member 102 corresponds to the center of the sphere 100 in the connection. As described above, the sphere 100 efficiently rolls for the correspondence of the center of the sphere 100 to the axis P. Although not shown in Figures, a horizontal brim portion may be respectively formed on the lower end edge 112 of the semispherical receiving member 102 and the connecting portion 111 of the ring frame 202, and the horizontal brim portions may be fastened by bolts and nuts to connect the semispherical receiving member 102 to the ring frame 202.

An interval L of an ejection gap portion 109, formed by an inner wall face 116 of the vertical connecting portion 103 of the ring frame 202 and the surface 117 of the sphere 100, is 40 to 80% of a diameter φ of the small sphere 101. The diameters φ of the small sphere 101 is 15 to 25 mm, and the interval L is, for example, 6 to 12 mm when the diameter φ is 15 mm, and 10 to 20 mm when the diameter φ is 25 mm. And, a dimension T of a micro gap portion 108, formed between the surface 117 of the sphere 100 and the scraping ring frame portion 106, is equal to or less than 10% of the small sphere 101, namely, equal to or less than 2.5 mm. The height D of the blade height setter 38 is 20 to 30 cm.

An attachment member 39, held by the holding rod 15, is disposed on a middle position between an upper top portion of the semispherical receiving member 102 and the lower end edge 112, and attached by a fixation member 110 such as bolt-nut connection as to be slid and fixed. The material of the blade height setter 38 is preferably plastic except the fixation member 110 such as bolts and nuts and the screw 105 for rust prevention, light weight, and reduction of frictional resistance. The sphere 100 is, for example, composed of a hollow shell of plastic. Other than the above-described embodiment, the ring frame 202 may be unitedly formed with the semispherical receiving member 102. The unitedly-formed semispherical receiving member 102 may be formed as a pair of symmetric parts including the vertical axis P, a brim portion may be disposed on each of connecting portions to be connected by bolts and nuts (not shown in Figures).

Figure 3:
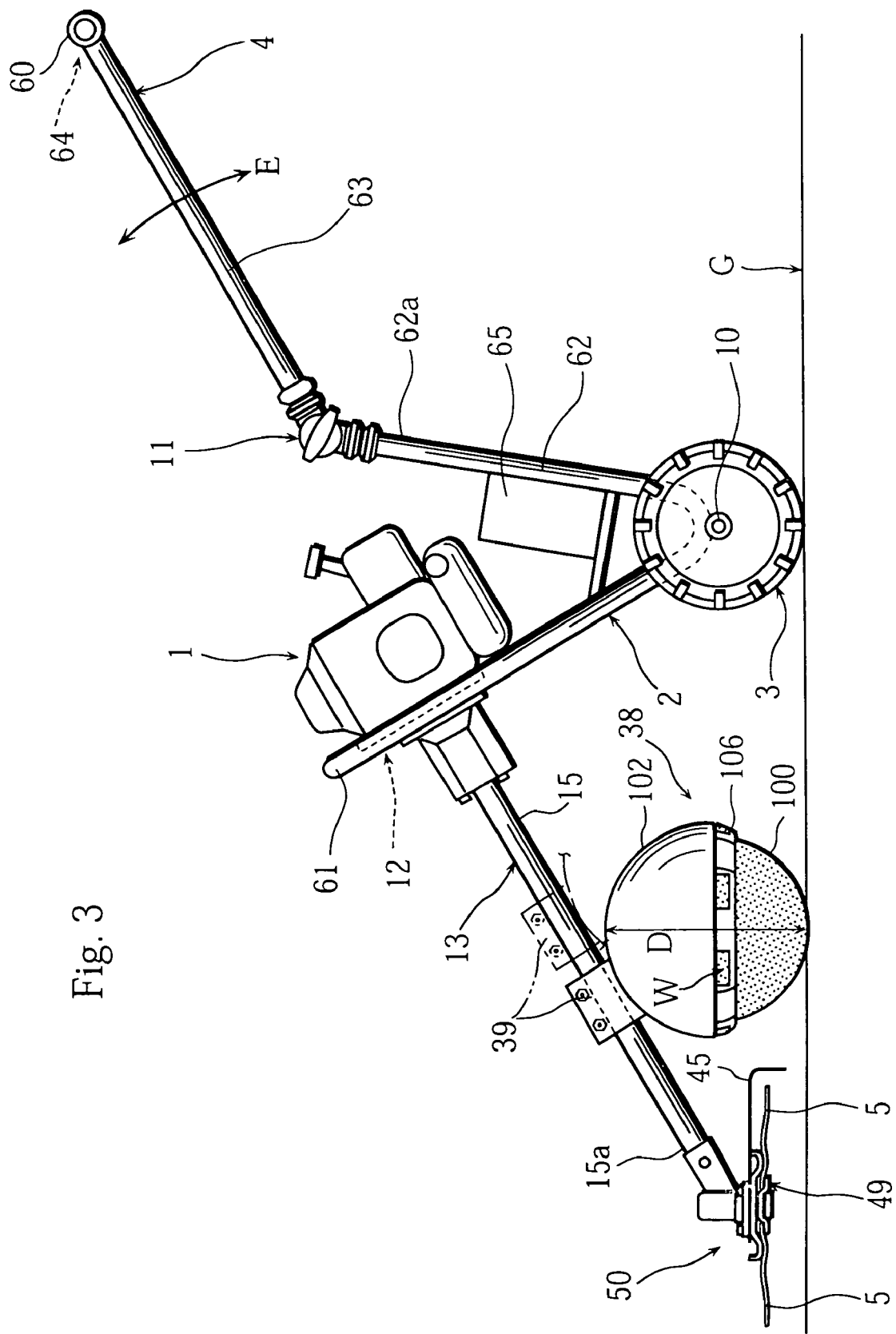
FIG. 3 is a side view showing another embodiment of the present invention.

FIG. 3 shows another embodiment of the present invention. Different points from the above-described embodiment in FIGS. 1 and 2 are as follows. First, the frame 2 is composed (mainly) of a pipe artfully bent and formed into the center frame 6, the frame body 9, and the supporting rod 8 shown for simplified and light-weight construction, and for easy production. That is to say, one pipe is bent and formed into a V-shape in a side view. And, in a plane view, the frame has a circular frame portion 61 (to which the attachment board 12 of the engine 1 is fixed) approximately a loop having a rear opening, and two parallel supporting rods 62 are continuing from the circular frame portion 61 as to extend backward. The two supporting rods 62 form the V-shape in side view, and the axle 10 is attached to lower ends (bottom) of the two supporting rods 62.

That is to say, right and left wheels 3 are attached to the lower end portion of the V-shaped frame 2 made of one pipe through the axle 10 as to freely rotate. And, the handle 4 is attached to a rear upper end portion 62a of the V-shaped frame 2 through the angle adjusting mechanism 11 as to oscillate only in up-and-down direction (refer to an arrow E) to adjust the attachment angle.

The configuration of the handle 4, different from that of the first and second embodiments, is that two pipes 63 approximately L-shaped in plane view are disposed line-symmetric, rear ends of the pipes 63 are connected and united with a connecting member 64, and front ends are connected by the angle adjusting mechanism 11. Therefore, grip portions 60 are directed horizontal, and the whole handle 4 may be approximately T-shaped. It is preferable to dispose heavy object 65 such as a battery within the V of the frame 2 approximately centered in the mower to keep the balance.

The embodiment shown in FIG. 3 is also a hand-pushed mower provided with the frame 2 to which the engine 1 is attached, the pair of wheels 3, the handle 4 having the grip portion 60 which a walking worker grips with hand, and the mowing blade 5 rotated by the engine 1, and, the wheels 3 are disposed on a middle position in longitudinal direction between the mowing blade 5 on the front position and the grip portion 60 on the rear position, the worker grips the grip portion 60 of the handle 4 with hand and pushes the mower to move while the weight of the mower is supported as in a balance on the contact point of the wheel 3 with the ground as a supporting point. This construction is common to the embodiment in FIGS. 1 and 2. Description of the rest of the members is omitted because they are similarly constructed.

When the mower of the present invention mows grass or loan in a house garden, an orchard, a golf course, etc., foreign matters 113 such as mown grass, grassroots, soil, muddy water, twigs, grits, etc. are scattered or exist on the ground G. And, the foreign matters 113 stick to the rolling sphere 100. Although the foreign matter 113 bigger than the dimension T is scraped (scraped off) by the scraping ring frame portion 106 and falling down to the ground G, a part of the foreign matter 113 is not scraped off by the scraping ring frame portion 106, gets into the gap S through the micro gap portion 108 and the ejection gap portion 109 along with the rolling of the sphere 100, and sticks to the surface 117 of the sphere 100, the plural small spheres 101, and the inner face of the semispherical receiving member 102. Then, the mowing is paused and the foreign matter 113 is drawn out of the window portion W by hand. And, when a water hose is inserted to the ejection gap portion 109 and water is sent into the gap S, grass, mud having high viscosity, etc. are ejected (washed away) from the window portion W with water.

According to the mower of the present invention constructed as described above, flat mowing in which loan is mowed to be uniform height is easily conducted, the work is conducted with three-point support by the pair of wheels 3 and the blade height setter 38 (or two-point support by one wheel 3 and the blade height setter 38), and the worker does not need to balance with the handle 4 as the mowing blades 5 keep a distance from the ground G because the blade height setter 38 can be set to keep the predetermined blade height H. The blade height setter 38, of which attachment member 39 is fixed to the holding rod 15 by bolts and nuts, is easily adjusted, the mower can stably run on the ground G, and the grass mown by the mowing blades 5 hits the blade height setter 38 and not reaches for the user because the blade height setter 38 has a spherical configuration of which height D is 20 to 30 cm.

The foreign matter 113, having a size which impedes the rolling of the blade height setter 38 when intruding to the gap S, is scraped off by the scraping ring frame portion 106 because the dimension T of the micro gap 108 is equal to or less than 2.5 mm. Further, the ejection gap portion 109 does not let the small sphere 101 go out, and has a sufficient size to remove the foreign matter 113. Therefore, even if a part of the foreign matter 113 passes through the micro gap 108, the foreign matter is easily taken out or washed away through the gap portion 109 and the window portion W, and usage of the mower becomes easy thereby. The blade height setter 38 is made easily and light-weight by molding of plastic. And, as shown with two-dot broken lines in FIG. 1, the attachment position of the blade height setter 38 is easily moved to adjust the blade height H, and the height of the mowing blade 5 from the ground G can be freely adjusted further. Therefore, mowing work can be conducted not only by skilled adults, but also by women and children with safe and easy operation because the mower always can lightly run and change the direction on the ground G.

According to the hand-pushed mower of the present invention, loan is mowed to be uniform height by the blade height setter 38, the work is conducted with three-point support by the pair of wheels 3 and the blade height setter 38 (or two-point support by one wheel 3 and the blade height setter 38), and the worker does not need to balance with the handle 4 as the mowing blades 5 keep a distance from the ground G. Mowing work can be conducted not only by skilled adults, but also by women and children with safe and easy operation because the mower can lightly run and change the direction because the blade height setter 38 lightly runs on the ground G. Further, maintenance is simple and the mower is always used comfortably because the foreign matters 113 such as mown grass, grassroots, soil, muddy water, twigs, grits, etc., getting into the semispherical receiving portion 102 of the blade height setter 38, are easily removed by hand or water pressure.

And, the plural small spheres 101 do not fall down, and the foreign matter 113 can be easily removed by means of hand or washing with water. Therefore, usage of the mower becomes easy.

And, the mower is easily used because the foreign matter 113, which impedes the rotation of the small spheres 101 and the sphere 100 of the blade height setter 38, is scraped off and prevented from getting into the semispherical receiving member 102 by the scraping ring frame portion 106.

And, the mower can stably run on the ground G. Further, the grass mown by the mowing blades 5 hits the blade height setter 38, and the grass is prevented from jumping to the user without a cover.

Further, the height of the loan can be freely adjusted because the blade height H can be adjusted by moving the attachment position of the blade height setter 38. And, attachment strength of the blade height setter 38 is high for stable fixation.

While preferred embodiments of the present invention have been described in this specification, it is to be understood that the invention is illustrative and not restrictive, because various changes are possible within the spirit and indispensable features.

What is claimed is:

1. A hand-pushed mower comprising:
   a blade height setter being disposed in front of a wheel and behind a mowing blade to keep a blade height at a predetermined value; the blade height setter being provided with a sphere rolling on a ground,
   plural small spheres holding the sphere as to freely roll,
   a semispherical receiving member forming a gap with an upper half of a spherical face of the sphere to hold the plural small spheres, and
   a stopping ring frame having a scraping ring frame portion on a lower part, an upper ring frame portion, and plural connecting portions in a vertical direction; the scraping ring frame portion being disposed near a surface of the sphere to scrape off foreign matter stuck to the surface; the scraping ring frame portion and the upper ring frame portion being connected by the plural connecting portions; and remaining portions of the stopping ring frame surrounded by the scraping ring frame portion, the upper ring frame portion, and the plural connecting portions forming window portions for removing foreign matter.

2. The hand-pushed mower as set forth in claim 1, wherein an interval formed by an upper inner wall face of the connecting portion in the vertical direction and the surface of the sphere is 40 to 80% of a diameter of the small sphere.

3. The hand-pushed mower as set forth in claim 1 or claim 2, wherein a dimension of a micro gap formed between the surface of the sphere and the scraping ring frame portion is equal to or less than 10% of a diameter of the small sphere.

4. The hand-pushed mower as set forth in claim 1 or claim 2, wherein height of the blade height setter is 20 to 30 cm.

5. The hand-pushed mower as set forth in claim 1 or claim 2, wherein the blade height setter is attached to a holding rod for connecting the mowing blade and an engine as to be freely slid and fixed.

* * * * *